United States Patent
Boscolo et al.

(10) Patent No.: US 6,841,903 B2
(45) Date of Patent: Jan. 11, 2005

(54) METHOD FOR DETECTING THE POSITION OF A ROTOR OF A DC MOTOR AND RELATED CIRCUIT

(75) Inventors: Michele Boscolo, Sottomarina (IT); Massimiliano Brambilla, Sesto S. Giovanni (IT); Ezio Galbiati, Agnadello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 28 days.

(21) Appl. No.: 10/285,362

(22) Filed: Oct. 30, 2002

(65) Prior Publication Data

US 2003/0173972 A1 Sep. 18, 2003

(30) Foreign Application Priority Data

Oct. 31, 2001 (EP) ............................................ 01830678

(51) Int. Cl.[7] ................................................ H02K 7/00
(52) U.S. Cl. ..................... 310/68 B; 318/254; 318/138; 318/439
(58) Field of Search ........................ 310/68 B; 318/138, 318/254, 439, 720, 721, 722, 723, 724

(56) References Cited

U.S. PATENT DOCUMENTS

| | | | |
|---|---|---|---|
| 4,520,302 A | 5/1985 | Hill et al. ................... 318/696 |
| 4,992,710 A | * 2/1991 | Cassat ......................... 318/254 |
| 5,159,246 A | * 10/1992 | Ueki ............................ 318/254 |
| 5,254,914 A | 10/1993 | Dunfield et al. ............ 318/254 |
| 5,486,743 A | * 1/1996 | Nagai .......................... 318/439 |
| 5,491,393 A | * 2/1996 | Uesugi ........................ 318/439 |
| 5,608,300 A | 3/1997 | Kawabata et al. .......... 318/721 |
| 5,949,204 A | * 9/1999 | Huggett et al. ............. 318/254 |
| 6,121,736 A | * 9/2000 | Narazaki et al. ............ 318/254 |
| 6,218,795 B1 | * 4/2001 | Syukuri ....................... 318/254 |
| 6,396,225 B1 | * 5/2002 | Wakui et al. ................ 318/254 |
| 6,538,404 B2 | * 3/2003 | Kato et al. .................. 318/254 |

* cited by examiner

*Primary Examiner*—Dang Le
(74) *Attorney, Agent, or Firm*—Lisa K. Jorgenson; Harold H. Bennett II; Seed IP Law Group PLLC

(57) ABSTRACT

A method for detecting the position of a rotor of a DC motor with N phases having a plurality of windings, comprising the steps of connecting two of the windings between first and second prefixed voltages through to a first current path for a prefixed time, allowing the current stored in the two windings to discharge through a second current path; comparing the voltage across one of the two windings with a reference voltage and providing a control signal when the voltage is smaller in absolute value than the reference voltage, performing the above steps for each of the winding pairs of the motor; detecting the position of the rotor on the basis of the control signals obtained.

25 Claims, 2 Drawing Sheets

METHOD FOR DETECTING THE POSITION OF A ROTOR OF A DC MOTOR AND RELATED CIRCUIT

BACKGROUND OF THE INVENTION

1. Field of the Invention

The present invention refers to a method for detecting the position of a rotor of a DC motor and to the related circuit.

2. Description of the Related Art

A DC motor comprises a permanent magnet that constitutes the rotor and a stator having a plurality of windings. This type of motor is commonly used to operate computer hard disks, DVDs (Digital Video Disk), CDs etc.

In most cases, DC motors have three phases and the driving circuit generally comprises integrated circuits whose output stages, typically half-bridges, drive the windings cyclically.

For the starting of a DC motor it is necessary to supply the windings in the correct combination of phases, and in order to do so it is necessary to know the position of the rotor.

The detection of the position of the rotor is based normally on the fact that the winding impedance depends on the position of the rotor. For this reason a small current is provided sequentially in each of the combinations of the windings and the voltage across an external resistance placed in series with each of the windings combinations is measured.

Particularly for a motor with three phases, U, V, and W, a current is made flowing sequentially between the following couples of phases: U-V, U-W, V-W, V-U, W-U, W-V, and the time, for each couple of phases, that the voltage across the resistance takes to arrive at a reference value is measured. Or, alternatively, the voltage across the resistance is measured after a prefixed time.

The value of the resistance varies normally from 100 milliohms to 500 milliohms and cannot be integrated inside of the integrated circuits and therefore it is placed outside with consequent increasing of the number of pins of the integrated circuit, bulk on the printed circuit board and increasing of the associated cost. Besides, the resistance causes a limit on the maximum voltage that can be furnished to the motor and has a not negligible power dissipation. In particular, such drawbacks take a remarkable importance in mobile applications and for devices supplied at low voltage (5 V and 3,3 V).

BRIEF SUMMARY OF THE INVENTION

An embodiment of the present invention provides a solution that may be completely integrated into the integrated circuit.

An embodiment of the present invention is directed to a method for detecting the position of a rotor of a DC motor with N phases having a plurality of windings, comprising the steps of: connecting two of said windings between a first and a second prefixed voltage according to a first current path for a prefixed time; allowing the current stored in said two windings to discharge through a second current path; comparing the voltage at the ends of one of said two windings with a reference voltage and providing a control signal when said voltage is smaller in absolute value than said reference voltage; performing the above steps for each of the winding couples of said motor; and detecting the position of said rotor on the basis of the control signals obtained.

Another embodiment of the invention is directed to a circuit for detecting the current of a DC motor with 3 phases, comprising three half-bridges for driving said motor; a voltage comparator having a first input applied to a supply voltage and having a second input connected to a controlled selector; said controlled selector allowing the selective connection of said second input of the comparator to a central point of said three half-bridges, in response to a control signal; and a control logic that receives in input an output of said comparator, determining, thereby, the position of the rotor.

Thanks to the present invention it is possible to determine the position of a rotor of a DC motor while eliminating the external resistance and therefore improving the performances of the motor. Particularly, in the absence of any voltage drop on the resistance, it is possible to supply a greater voltage to the motor and therefore a greater starting current and a greater maximum speed, with a lower total dissipated power.

BRIEF DESCRIPTION OF THE SEVERAL VIEWS OF THE DRAWING(S)

The features and the advantages of the present invention will be evident from the following detailed description of an embodiment thereof, illustrated as a non-limiting example in the annexed drawings, wherein.

DETAILED DESCRIPTION OF THE INVENTION

Figure 1:
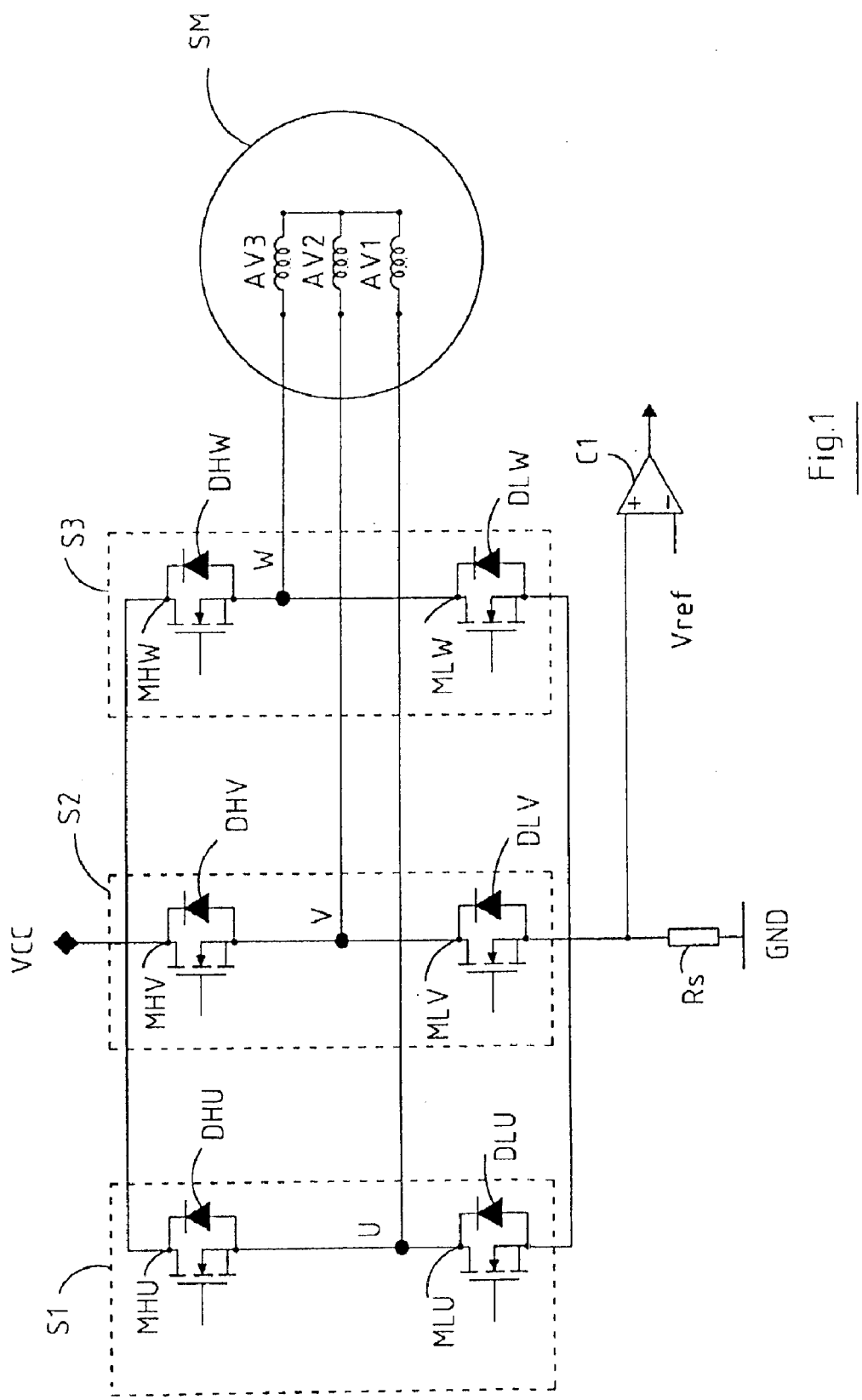
FIG. 1 represents the partial scheme of a driving circuit of a three-phase motor according to the known art.

In FIG. 1, which represents the partial scheme of a driving circuit of a three-phase motor according to the known art, there are three substantially identical driving circuits at half-bridge S1, S2, and S3. Each of the half-bridges is constituted by a high side transistor and a low side transistor, each one with the associated reflow diode, respectively indicated with MHU, MLU and DHU, DLU for the half-bridge S1; MHV, MLV and DHV, DLV for the half-bridge S2; and MHW, MLW and DHW, DLW for the half-bridge S3. The high side transistors have their drains connected to the positive supply voltage Vcc, the low side transistors have their sources connected together and connected to the ground Gnd through a resistance Rs. The source of each high side transistor is connected to the drain of each low side transistor. The point of connection of the half-bridge S1 corresponds to the U phase and is connected to a terminal of the winding AV1, the point of connection of the half-bridge S2 corresponds to the V phase and it is connected to a terminal of the winding AV2; and the point of connection of the half-bridge S3 corresponds to the W phase and it is connected to a terminal of the winding AV3. The other terminals of the windings AV1, AV2, and AV3 are connected together. Such windings represent a 3-phase motor SM schematically.

The gates of the transistors are connected to a control circuit, not shown, that controls the supply of the phases U, V and W of the motor SM.

The positive terminal of a comparator C1 is connected to the resistance Rs, a voltage reference Vref is applied to the negative terminal of the comparator C1. The output of the comparator C1 is connected to the control circuit, not shown, that is able to determine the position of the rotor.

For the detection of the position of the rotor a current is made to flow between one of the couples of phases U-V, U-W, V-W, V-U, W-U, W-V, controlling in the right way the transistors of the half-bridges S1, S2 and S3, and the time elapsed between the activation of the transistors and the time in which the voltage at the ends of the resistance Rs overcomes the reference voltage Vref and switches the comparator C1 is measured. The operation is repeated for all the couples of remaining phases and therefore the control circuit effects the calculations for determining the position of the rotor.

Figure 2:
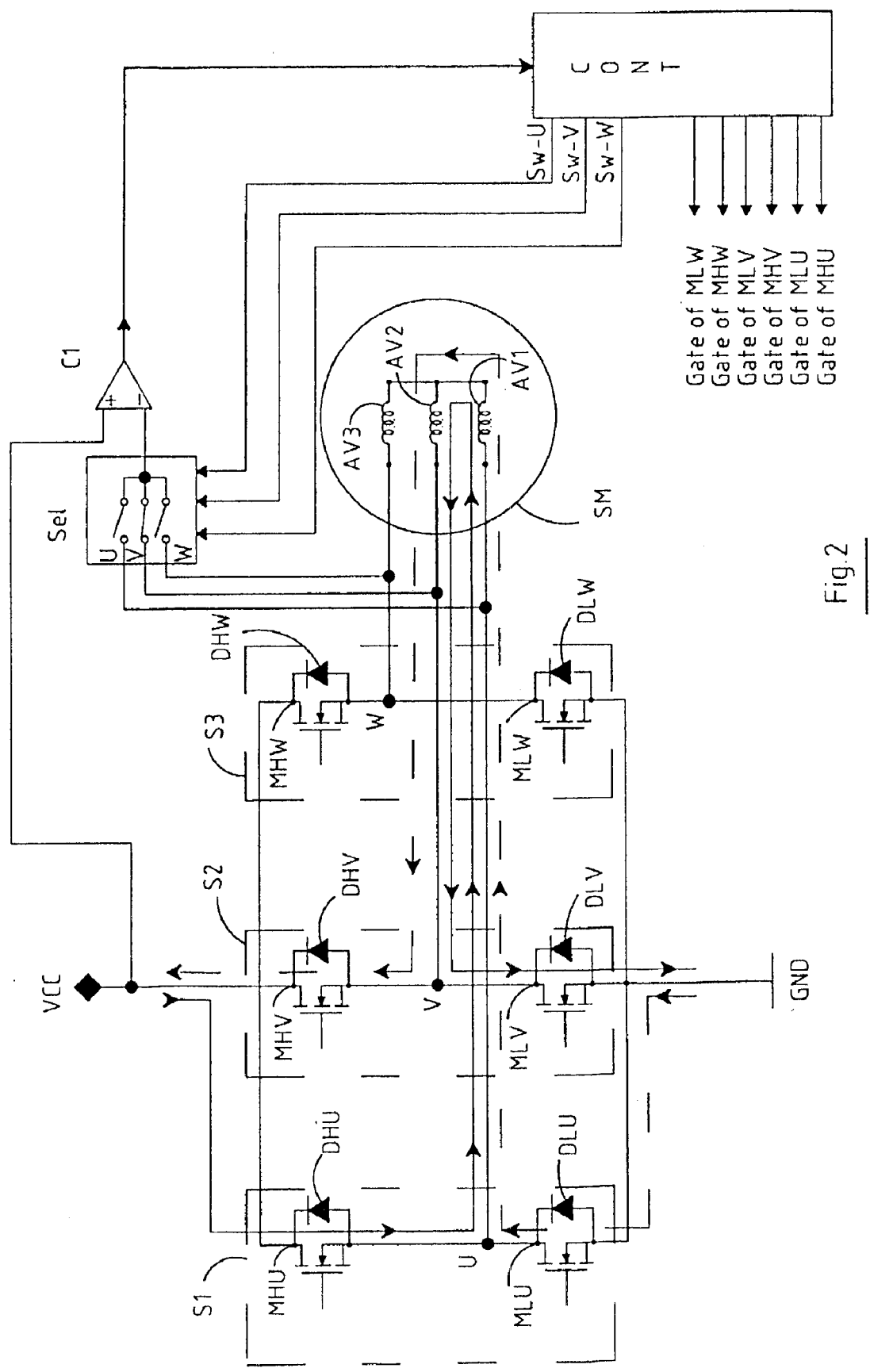
FIG. 2 represents the partial scheme of a driving circuit of a three-phase motor according to the present invention.

In FIG. 2, which represents the partial scheme of a driving circuit for a three-phase motor according to the present invention, the elements equal or similar to those of FIG. 1 have the same indicative references.

With respect to FIG. 1 the resistance Rs is missing, and the positive terminal of the comparator C1 is connected to a reference voltage that in this case corresponds to the positive supply Vcc. The negative terminal of the comparator C1 is connected, through a selector Sel composed of three switches, to the three phases U, V, W of the motor SM. The output of the comparator C1 is connected to a control circuit Cont, which also provides the control to the selector Sel and to the gate of the transistors of the three half-bridges S1, S2, and S3.

According to an embodiment of the present invention, a first pair of phases, for example U-V, is supplied for a prefixed time Tact (that can be programmable to make the system flexible), the selector is set so that the negative terminal of the comparator C1 is connected to the phase V. The output stage, that is the transistors of the half-bridges S1, S2, and S3, are set at high impedance and the necessary time for the decay of the current to zero is measured.

More precisely, if the U-V phase is fed, by activating the transistors MHU and MLV and leaving the others switched off, for a Tact time the current in the phases U and V, and therefore in the windings AV1 and AV2 of the motor SM, will start to flow along the continuous line path of FIG. 2. At the end of the Tact time the two transistors MHU and MLV are switched off activating a condition of high impedance (for all the six transistors of the half-bridges S1, S2, and S3). At this point the current stored in the two windings AV1 and AV2 starts to reflow through the diodes DHV and DLU along the dotted line path of FIG. 2, starting the decay phase. During all the time of this phase the voltage of the V phase will have a greater value than the supply voltage Vcc, while the voltage of the U phase will have a smaller value of the ground voltage Gnd. Once the decay phase of the current is ended the two diodes DHV and DLU are de-activated and the voltage of the V phase will have a smaller value than the supply voltage Vcc, while the voltage of the U phase will have a greater value than the ground voltage Grid.

By the change of the value at the output of the comparator C1, that is at the reaching of the reference voltage, and therefore at the reaching of the supply voltage Vcc, it is possible to determine the decay time of the current stored in the windings AV1 and AV2. Particularly, in the previous case by measuring the voltage of the phase V, the value of output of the comparator C1 will be at low level for all the reflow time and it will be at high level at its end.

By repeating the same steps for each of the six possible configurations of the phases it is possible therefore to measure the six different times necessary for the decay of the current and therefore to allow the control circuit Cont to determine the position of the rotor by means of operations well known to the technician skilled in the art.

Hereinbelow a table (TABLE 1) is shown that points out for each couple of phases how the negative terminal of the comparator C1 must be connected through the selector Sel.

TABLE 1

| Pair of phases supplied | Phase to be measured |
| --- | --- |
| U-V | V |
| U-W | W |
| V-W | W |
| V-U | U |
| W-U | U |
| W-V | V |

According to another embodiment of the present invention, the comparator C1 can have the positive terminal connected to the ground voltage Gnd, the value of the output voltage will be at high level for all the reflow time and it will be at low level at its end. Accordingly, the table that points out for each couple of phases how the negative terminal of the comparator C1 must be connected through the selector Sel, will be modified as from the TABLE 2 which is below reported.

TABLE 2

| Pair of phases supplied | Phase to be measured |
| --- | --- |
| U-V | U |
| U-W | U |
| V-W | V |
| V-U | V |
| W-U | W |
| W-V | W |

However, the positive terminal of the comparator C1 can have as reference voltage any voltage comprised between Vcc and Gnd.

According to a further embodiment of the present invention, instead of activating a condition of high impedance for all three half-bridges S1, S2 and S3, it is possible to activate the low side transistor of the couple of phases opposed to the supplied one. For example if the pair of phases UV, that is the transistors MHU and MLV, is supplied for a Tact time, and then the transistor MLU is activated (setting all the others at high impedance) the current will reflow through the transistor MLU and the DHV diode.

In a further variant, the transistor MHV can be activated (setting all the others at high impedance) and the current will reflow through the transistor MHV and the DLU diode.

Or, also in an alternative way, for the current reflow both the transistors of the phase opposed to the supplied one can be activated. For example, if the couple of U-V phases, that is the transistors MHU and MLV is supplied for a Tact time, and then the transistors MLU and MHV are activated (setting all the others at high impedance), the current will reflow through the aforesaid transistors.

The only difference of these variants, with respect to the first embodiment is that at the terminal of the comparator C1 a different voltage will appear according to the cases.

Thanks to the present invention it is possible to determine the position of a rotor of a DC motor while eliminating the external resistance and therefore improving the performances of the motor. Particularly, in the absence of any voltage drop on the resistance, it is possible to supply a greater voltage to the motor and therefore a greater starting current and a greater maximum speed, with a lower total dissipated power.

An additional benefit of the present invention is that the control circuit may be contained entirely in an integrated circuit, without the need for the external resistance, thus reducing the bulk of the control circuit and the complexity of the external circuitry.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. Method for detecting the position of a rotor of a DC motor with N phases having a plurality of windings, comprising:

connecting two of said windings between first and second prefixed voltages through to a first current path for a prefixed time;

allowing the current stored in said two windings to discharge through a second current path;

comparing a voltage across one of said two windings with a reference voltage and providing a control signal when said voltage is smaller in absolute value than said reference voltage;

performing the above steps for each of plural winding pairs of the windings of said motor; and detecting the position of said rotor on the base of the control signals obtained.

2. Method according to claim 1 wherein N equals three.

3. Method according to claim 1 wherein said first prefixed voltage is the supply voltage and said second prefixed voltage is ground.

4. Method according to claim 1 wherein said reference voltage is the supply voltage.

5. Method according to claim 1 wherein said second current path connects said two windings between said second and said first prefixed voltage.

6. Method according to claim 1 wherein the step of allowing the current stored in said two windings to discharge through a current path includes of setting the N phases at high impedance.

7. Method according to claim 1 wherein said first current path is formed by the activation of two transistors.

8. Method according to claim 1 wherein said second current path is formed by the activation of two transistors.

9. Method according to claim 1 wherein said second current path is formed by activation of a transistor and of a diode.

10. Method according to claim 1 wherein said second current path is formed by activation of two diodes.

11. Method according to claim 1 wherein the comparing step includes deriving a value of the control signal based on a length of time required for the voltage to drop below said reference voltage.

12. The method of claim 11 wherein the reference voltage is circuit ground.

13. Circuit for detecting the current of a DC motor with three phases, comprising:

three half-bridges for driving said motor;

a voltage comparator having a first input applied to a supply voltage and having a second input connected to a controlled selector, said controlled selector allowing the selective connection of said second input of the comparator to a central point of any one of said three half-bridges, in response to a control signal; and a control logic that receives in input the output of said comparator, detecting the position of the rotor therefrom.

14. A method, comprising:

introducing a voltage across a pair of series connected motor windings for a period, Tact;

comparing, after the introducing step, a voltage over time across one motor winding of the pair of motor windings with the value of the voltage introduced across the pair of windings; and determining, based on a result of the comparing step, the position of a motor rotor with respect to the pair of windings.

15. The method of claim 14 wherein the comparing step includes measuring the length of a period required for the voltage across the one of the pair of windings to drop below the value of the voltage introduced across the pair of windings.

16. A device, comprising:

a pair of motor windings;

means for selectively coupling a first end of the series connected windings to a supply voltage and a second end of the windings to a circuit ground for a selected period, T1; and means for comparing a voltage across one of the pair of windings with the supply voltage, after the period T1.

17. The device of claim 16, further comprising detection means for determining a position of a rotor relative to the pair of windings based upon an output from the comparing means.

18. The device of claim 17 wherein the detection means determines the position of the rotor based upon the length of a period during which the voltage across the one of the pair of windings remains greater than the supply voltage.

19. The device of claim 17 wherein the detection means determines the position of the rotor based upon the relative values of the voltage across the one of the pair of windings and the supply voltage, after a selected period, T2.

20. A device, comprising:

a pair of motor windings;

means for selectively coupling a first end of the series connected windings to a supply voltage and a second end of the windings to a circuit ground for a selected period, T1; and means for comparing a voltage across one of the pair of the pair of winding with a circuit ground.

21. The device of claim 20, further comprising:

a rotor; and means for determining a position of the rotor based upon an output of the measuring means.

22. The device of claim 21 wherein the determining means includes means for measuring a period of time required for the voltage across the one of the pair of windings to reach the level of circuit ground.

23. A method, comprising:

introducing a voltage across a pair of series connected motor windings for a selected period;

comparing a voltage level, at a terminal of one motor winding of the pair of motor windings, with a reference voltage;

measuring a length of time until the voltage drops, in absolute value, below the reference voltage; and determining, based on a result of the measuring step, the position of a motor rotor with respect to the pair of winding.

24. The method of claim 23 wherein:

the pair of motor windings is two of a plurality of motor windings;

the introducing step includes introducing the voltage, for respective selected periods, across pairs of the plurality of motor windings in a plurality of permutations;

the comparing step includes comparing a respective voltage level, at a terminal of one motor winding of each of the pairs of motor windings, with the reference voltage;

the measuring step includes measuring a respective length of time until the respective voltage level drops, in absolute value, below the reference voltage; and the determining step includes determining, based on results of the measuring step, the position of the motor rotor with respect to all of the plurality of windings.

25. The method of claim 23 wherein the reference voltage is a supply voltage.

* * * * *